United States Patent [19]

Zheng

[11] Patent Number: 4,815,784
[45] Date of Patent: Mar. 28, 1989

[54] AUTOMOBILE SUNSHIELD

[76] Inventor: Yu Zheng, 1122 Armada Dr., Pasadena, Calif. 91103

[21] Appl. No.: 152,639

[22] Filed: Feb. 5, 1988

[51] Int. Cl.⁴ .............................................. B60J 3/00
[52] U.S. Cl. .................................. 296/97.7; 296/97.8; 160/DIG. 2; 160/329
[58] Field of Search ................. 296/97 R, 97 C, 97 E, 296/97 G, 95 C; 160/DIG. 2, 327–329

[56] References Cited

U.S. PATENT DOCUMENTS

| | | | |
|---|---|---|---|
| 4,647,102 | 3/1987 | Ebrahimzadeh | 296/97 D |
| 4,652,039 | 3/1987 | Richards | 296/97 R |
| 4,671,558 | 6/1987 | Cline | 296/97 R |
| 4,763,947 | 8/1988 | Gregg | 296/97 R |

Primary Examiner—Robert R. Song
Attorney, Agent, or Firm—Charles H. Schwartz; Ellsworth R. Roston

[57] ABSTRACT

A collapsible elongated sun sheild including, a plurality of adjacent collapsible flexible loop members. A fabric covering material for substantially covering the flexible loop members. The loop members substantially supporting the fabric in particular areas to provide for loop portions and an interconnecting portion forming a hinge between each loop portion. The loop portions of the fabric are folded on top of each other about the hinge portion to have the loop members and associated fabric overlaying each other. The overlaying loop members are collapsed by twisting and folding to form a plurality of concentric loop rings and layers of fabric to substantially reduce the size of the sunshield.

16 Claims, 8 Drawing Sheets

AUTOMOBILE SUNSHIELD

BACKGROUND OF THE INVENTION

1. Field of the Invention

The present invention relates to sunshields and specifically to automobile sunshields or shades. The sunshield of the present invention may be positioned against an interior window surface, such as the windshield, to act as a barrier and protect the interior of the motor vehicle against sun rays. This thereby reduces undesired weathering caused by sun rays and reduces the heat which tends to build up within the vehicle interior.

2. Description of the Prior Art

In general, prior art automobile sunshields may be positioned to shield the interior of the vehicle from either an interior or exterior location. As an example, interior sun shades include a folding cardboard windshield shade such as shown in the patent to Levy U.S. Pat. No. 4,202,396. Another type of interior windshield shade is a fan-like venetian blind of the type shown in Surtin U.S. Pat. No. 4,332,414, or Maguire U.S. Pat. No. 4,606,572. These types of interior shades have had certain difficiencies. For example, the folding cardboard shades are bulky when folded and difficult to store. When opened, the cardboard shades tend to return to the folded position thereby not providing for a complete covering of the windshield. The fan-like venetian blind shades are usually mounted semi-permanently and are awkward to use, expensive in cost and again, do not provide for a full coverage of the windshield when opened to the full position.

In addition to the interior shades, exterior screens may also be used and for example, may consist of a thin layer of fabric or plastic to lie on the exterior surface of the windshield. This type of structure is of course subjected to the elements and can quickly become dirty or damaged thereby requiring frequent replacement. In addition, films have been applied to the windshield, but such films can not legally obstruct the driver's vision so that the films cannot be opaque enough in order to adequately protect the interior of tthe vehicle from the sun's rays.

The various existing sunshields, including the folding boards, fan-like venetian blinds, films and screens have not been successful in providing for all of the necessary requirements for a sunshield or shade. Specifically, these requirements are a high blockage of the suns rays and ease of use and a compact size when not in use for ease of storage. The present invention, therefore, provides for an improvement over the prior art sunshields and provides for a high blockage of the sun's rays, a simplicity of structure, ease of use and a very compact size when collapsed for storage.

SUMMARY OF THE INVENTION

In order to accomplish the objects of the present invention, a sun shade is constucted of two flexible circular loops which are positioned adjacent each other. The loops are covered by a sheet fabric material. Specifically, the loops may be enclosed within shaped openings that are formed within the fabric material. For example, the fabric material may include a pair of sheets of fabric material which are attached together at particular positions to provide for the defined adjacent openings to receive the flexible circular loops.

The use of the two side by side loops covered by fabric creates a broad elliptical screen in the fully extended position for the sunshield of the present invention. Therefore, the sunshield in the extended position may be located adjacent a window, such as the windshield of the automobile, and with the sunshield maintained in position by portions of the automobile such as window trim, visors and rear view mirror. The sunshield may be positioned adjacent other windows such as the rear window or side windows using an appropriate holding device. Since each of the loop members and associated sheet fabric material is independent from the other, the sheet fabric material between the loops can, therefore, fold and bend in a central position like a hinge. This allows for the shield in the fully extended position to easily adapt to different size and shaped windows and can accommodate and substantially cover these windows to block the suns rays.

When it is desired to remove the sunshield and store it for later use, the two fabric covered loop members are folded one on top of the other at the fabric hinge to reduce the structure in half. The two loops now may be twisted and twisted into a configuration so that the structure collapses upon itself to form a much smaller series of concentric loops and layers of fabric. The size of the entire sun screen may then be reduced to circular members less than a foot (1") in diameter and preferably less than ten inches (10") in diameter so that the sunshield in its collapsed state may be very easily stored.

In addition to the above, the sunshield of the present invention provides for a device having a reflecting surface to reflect the sun's rays to thereby protect the automobile interior and to subsantially reduce heat buildup within the vehicle. In addition, the present invention is simply in construction so that it may be economically manufactured and relatively low in cost. Because the sunshield of the present invention in its extended size is large, but in its collapsed state is relatively small, this enhances the usability of the device since it can be stored in an easily accessible position, such as in a side pocket of the automobile door or under the car seat. Because the device of the present invention uses sheet fabric as the outer surfaces, it is apparent that this fabric may be attractively printed or woven so that the sunshield can have a desirable attractive appearance when in use.

The collapsing aspect of the flexible loops, is similar to the method of folding and storing bandsaw blades for packaging and storage. In addition, a cloth hat currently sold in the Orient also includes a similar flexible circular member which can fold together to provide for storage. However, these devices incorporate a single flexible loop having only a circular shape when in the expanded position, whereas the present invention provides for a pair of such flexible circular loops, each covered in fabric and joined together so as to produce for the broad elliptical shaped shield when in the extended position. Although the twisting and folding of the present invention is similar to the bandsaw blades and Oriental cloth hat, the present invention provides for an additional complexity in folding together two or more flexible loops and twisting and folding these loops simultaneously so as to collapse all of the loops and the fabric into a small size structure.

BRIEF DESCRIPTION OF THE DRAWINGS

A clearer understanding of the present invention will be had with reference to the following description and drawings wherein.

DETAILED DESCRIPTION OF THE PREFERRED EMBODIMENTS

Figure 1:
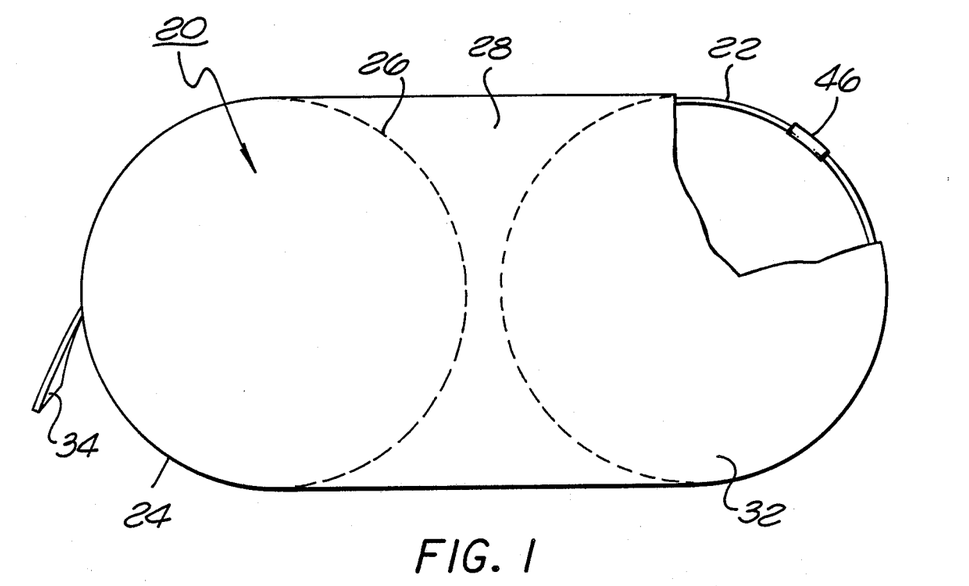
FIG. 1 is a elevational view partially broken away showing an automobile sunshield or shade of the present invention illustrating the internal loop frame structure.

As shown in FIG. 1, a sunshield 20 is formed by a pair of resilient loop members 22 forming frames. The loop members are retained in position by a peripheral loop portion of fabric 24 which includes an internal loop retaining structure 26. Located between the loop retaining structues 24 and 26 is an interconnecting fabric 28 or hinge portion. The fabric 28 is not in tension, but the fabric portion 32 within the loop members 22 may be in tension. As an example, the internal loop structure 26 may be provided by mechanically fastening (stitching), fusing, or gluing so that the loop frame members 22 are retained in position. A retaining member 34 may be attached at one end of the sunshield. Also, a bag can be used to store the sunshield in the collapsed state if desired. Also as shown in FIG. 1, the flexible loop frame 22 may be formed of a flexible material such as flexible steel and with the ends held together by a retaining clip 46.

Although the loops 22 are described as formed of flexible steel, other materials such as plastics may be used. The term fabric is to be given its broadest meaning and may includes woven fabrics, sheet fabrics or even films.

Figure 2:
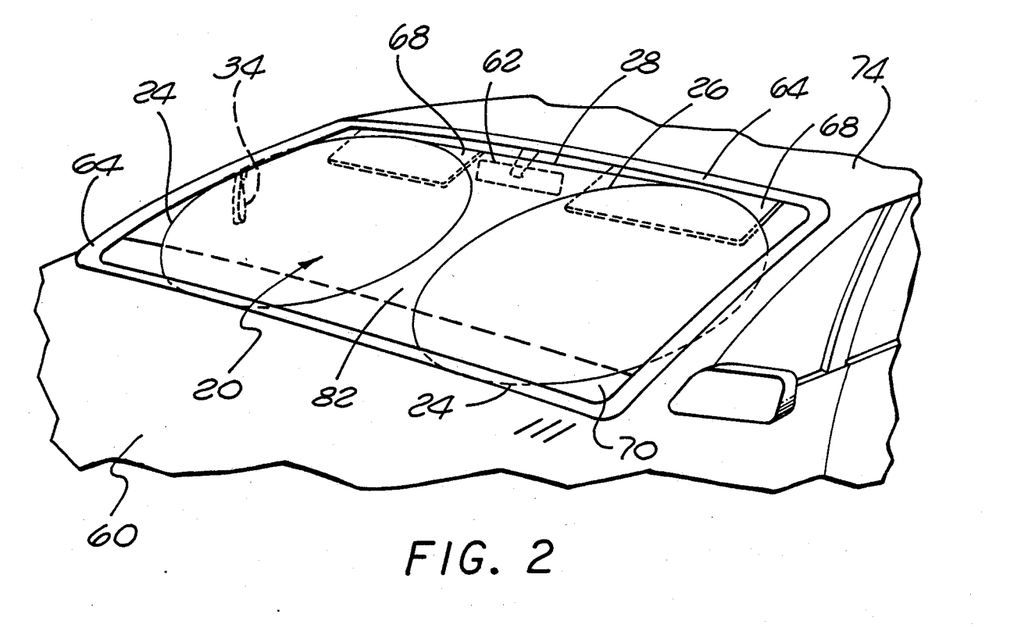
FIG. 2 is a perspective view of the sunshield the present invention in position behind an automobile windshield.

As shown in FIG. 2 the sunshield 20 may be positioned behind a windshield 82 of a vehicle 60. The windshield is held in position by a window frame 64 and the sunshield 20 is positioned between a dashboard 70 and a roof 74 of the vehicle 60. Visors 68 and rear view mirror 62 may be used to help retain the sunshield 20 in position.

Figure 3:
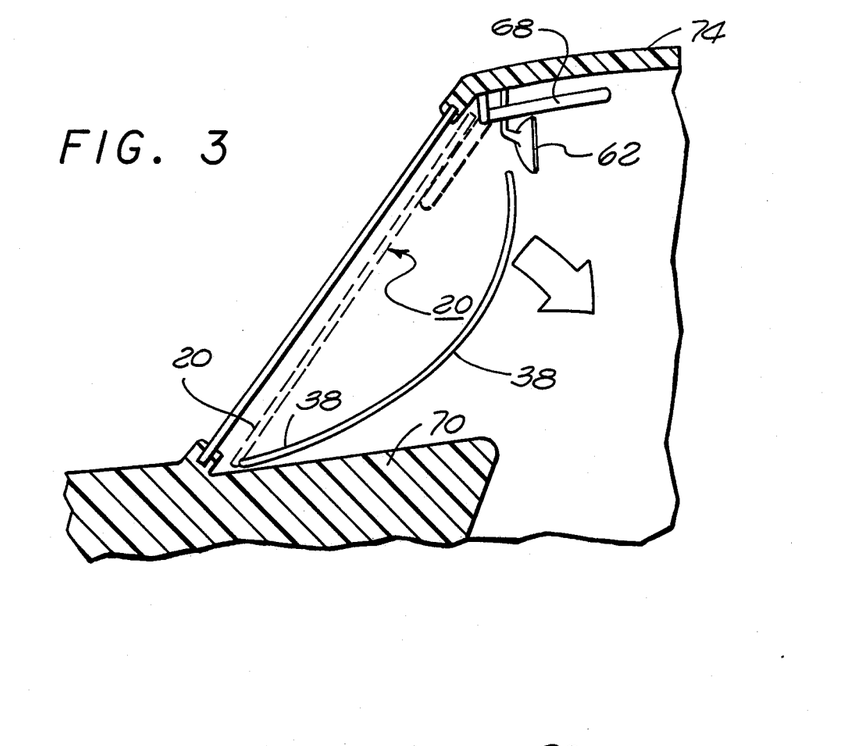
FIG. 3 is a side view of the sunshield and the windshield both in a partially deflected position for either placement or removal and in a fully extended position for shielding.

FIG. 3 illustrates a side view of the automobile illustrating the sunshield 20 in dotted position being retained behind the windshield 82 between the dashboard 70 and held in position by the visors 68 and rear view mirror member 62. In full position shown by the reference character 38, the sunshield 20 is illustrated to be bent for easy placement or removal from the windshield. It is to be appreciated that the sunshield 20 may also be left in a reclining position against the steering wheel (not shown) to provide for some protection against the sun rays, but the preferred position is as shown in dotted line in FIG. 3.

Figure 4:
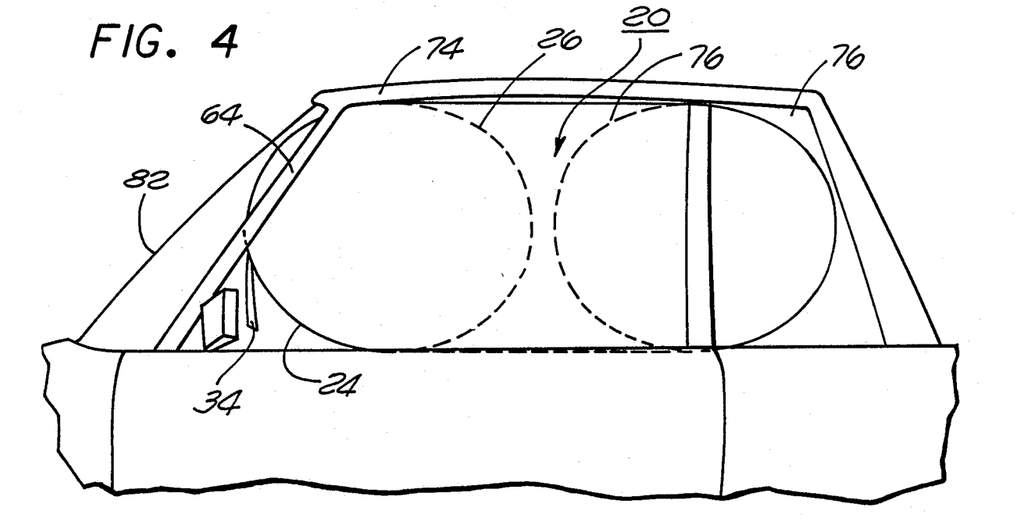
FIG. 4 is a elevational view showing the sunshield along the side view of the vehicle.
Figure 5:
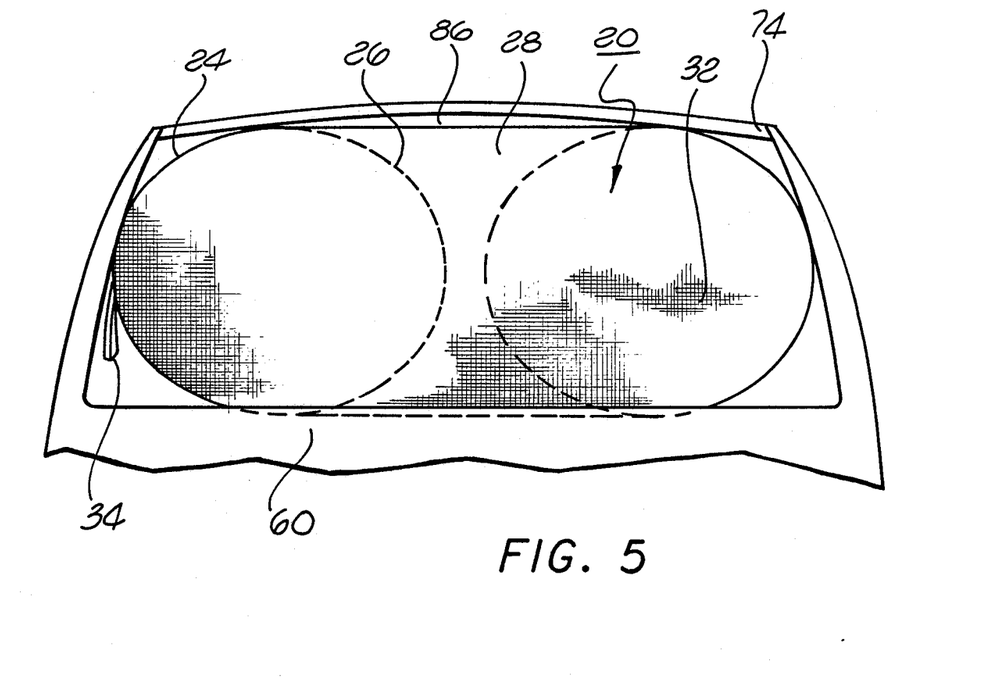
FIG. 5 is an elevational view showing the sunshield in the rear window of a vehicle.

FIG. 4 illustrates the sunshield 20 of the present invention positioned against the side of the vehicle so as to block sun rays coming in through side windows 76. Similarly, FIG. 5 illustrates the sunshield 20 of the present invention positioned against a rear window 86 to block the sun's rays passing through the rear window of the vehicle 60.

Figure 6:
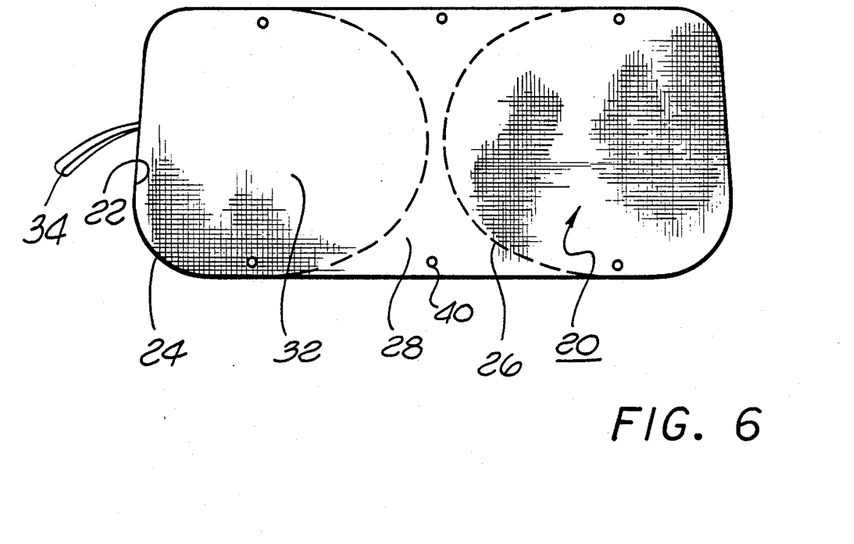
FIG. 6 is a second embodiment of the sunshield having truncated sides with rounded corners relative to the embodiment shown in FIG. 1.
Figure 7:
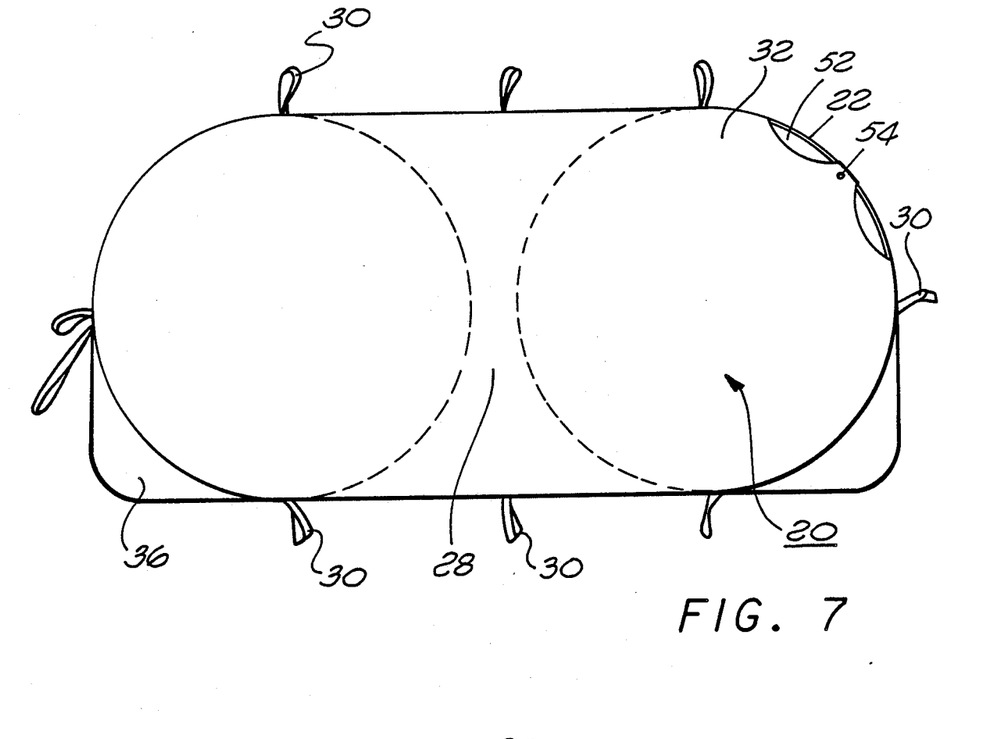
FIG. 7 is an elevational view of a third embodiment similar to the embodiment of FIG. 1, but additionally showing flap portions and accessory attachment loops and also illustrating how a portion of the fabric may be cut away.

FIG. 6 illustrates a second embodiment of the sunshield 20 of the present invention wherein the outer peripheral loop portions 24 have truncated sides with rounded corners. This shape may provide for a closer approximation of the windshield perimeter of some vehicles. The shape of the sunshield 20 of FIG. 6 is provided by having the internal loop frame 22 being flexible enough to follow the external fabric periphery 24. As an alternative, as shown in FIG. 7, additional flap members 36 may be formed to provide for the truncated side portions, but in the embodiment of FIG. 7, the internal loop frame 22 has a circular configuration. It can be seen, therefore, that the sunshield 20 of the present invention may take a variety of external shapes and with these external shapes, provided either by the additional of flaps such as flaps 36 to define the shape, or by having the peripheral loop portion 24 formed with the desired shape and with the internal loop frame member 22 conforming to this peripheral loop shape.

FIGS. 6 and 7 also show additional modifications that may be made to the sunshield 20 of the present invention. For example, as shown in FIG. 6, grommets 40 may be formed in the fabric, both in the nontension portion 28 and the tension portion 32 and with these addtional grommets used for the attachment of the sun screen by accessory members such as elastic members. Alternately, additional hanging loops 30 may be attached at peripheral portions around the sunshield 20 to also provide for attachment means. FIG. 7 also illustrates that if desired, the fabric such as the tension fabric 32 may be cut away, such as at positions 52 and may be attached such as through the use of rivets 54.

Figure 8:
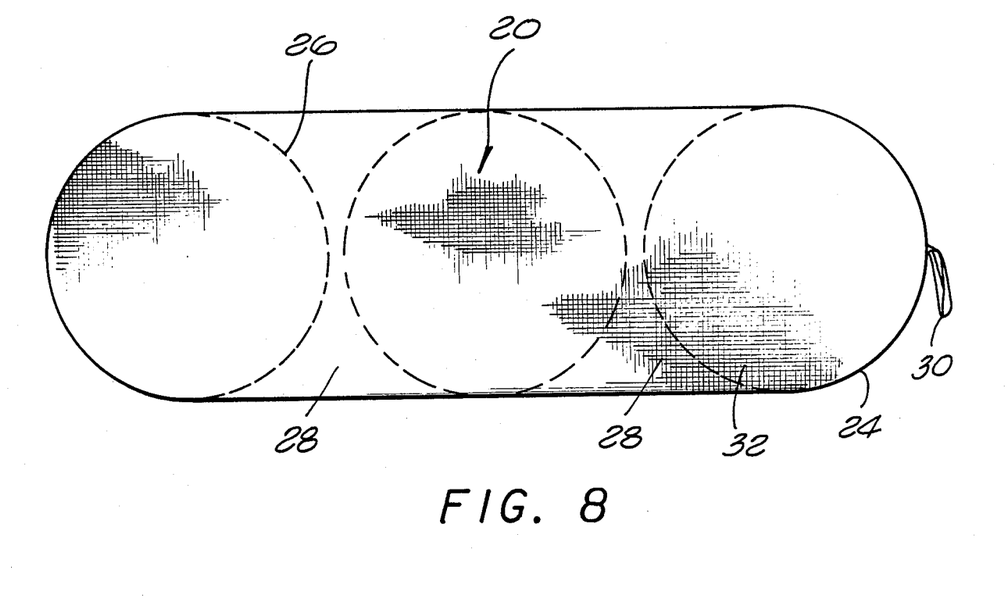
FIG. 8 is an elevational view of the present invention illustrating additional loop members.

FIG. 8 further illustrates how the sun screen 20 may be composed of a larger number of loop members such as the use of three loop members as shown in FIG. 8.

Figure 9:
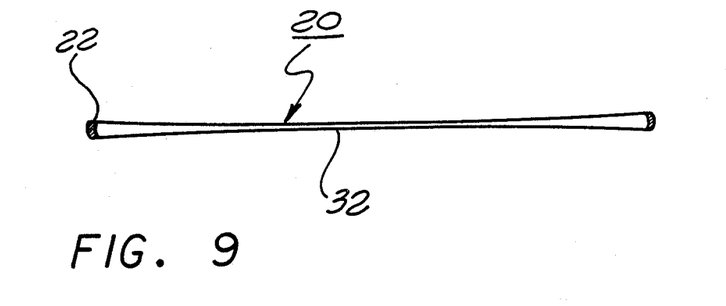
FIG. 9 is a sectional view through a midpoint of one of the loop members illustrating the use of two layers of fabric.
Figure 10:
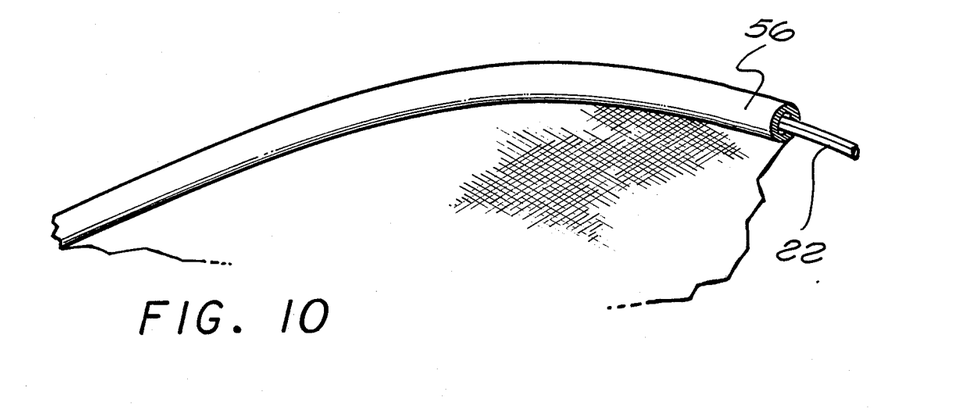
FIG. 10 is a fragmentary perspective view illustrating the use of a single layer of fabric with the loop members.

FIGS. 9 and 10 illustrate the alternative use of either two sheets of fabric, or a single sheet of fabric. As shown in FIG. 9, which is a cross sectional view of one of the loops in the tension area 32, fabric on both sides wrap around the flexible internal frame loop member 22. The frame member 22 is, therefore, held in position within the two layers of fabric in the tension area 32. As shown in FIG. 10, a single fabric member may be either wrapped around the frame member 22, as shown by to be portion 56, or may be formed as an external tube to contain the frame 22 and with the tube 56 attached to the fabric. In either event, a single layer of fabric is used.

Figure 11:
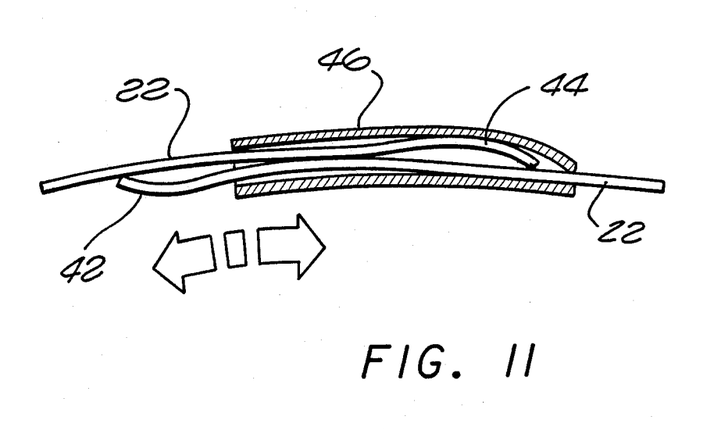
FIG. 11 is a cross sectional view of a sliding attachment for the ends of the loop members.

FIG. 11 illustrates a specific design for the retaining clip 46. It is to be appreciated that the loop 22 may be formed by bending a straight piece of material and having the ends of the straight piece held together by the retaining clip 46. The ends of the frame 22 could be held in rigid position, but as shown in FIG. 11, ends 42 and 44 of the frame 22 may be received within the retaining clip 46 to slide relative to each other. This allows for some sliding movement of the ends 42 and 44 to thereby facilitate the manufacture of the sunshield and allow for some flexibility to accomodate any changes in size within the tension loop 32.

Figure 12A:
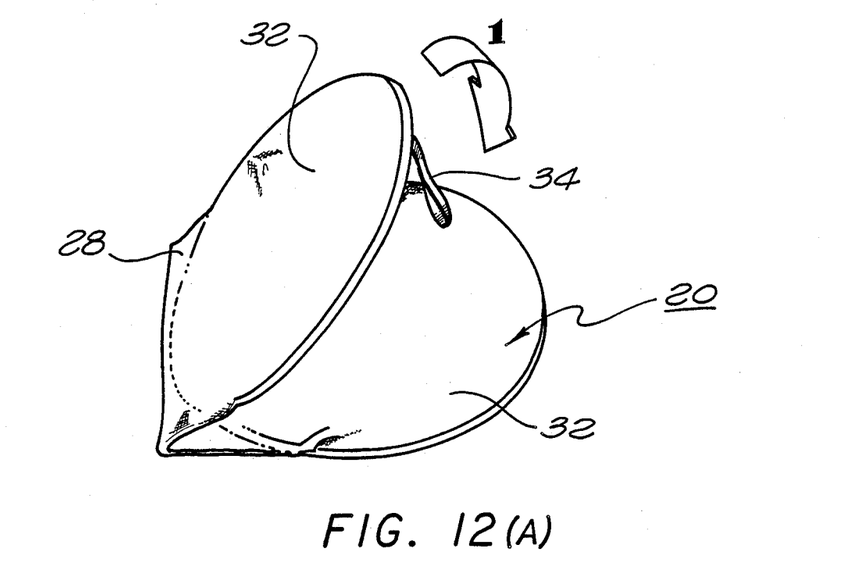
FIGS. 12(A) through 12(F) illustrate the operation of the sunshield of the present invention showing how it may be folded up for compact storage.
Figure 12B:
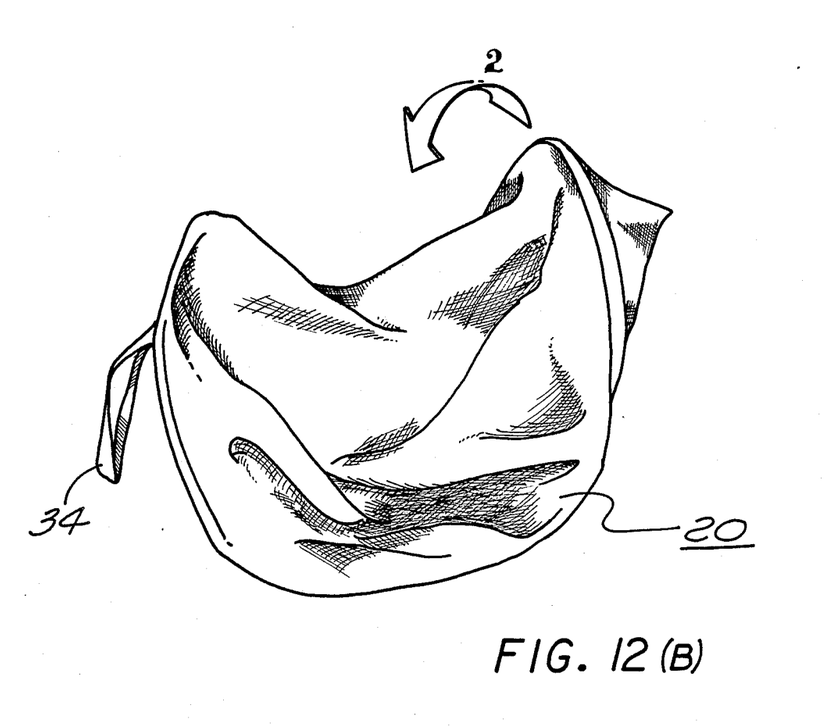
Figure 12C:
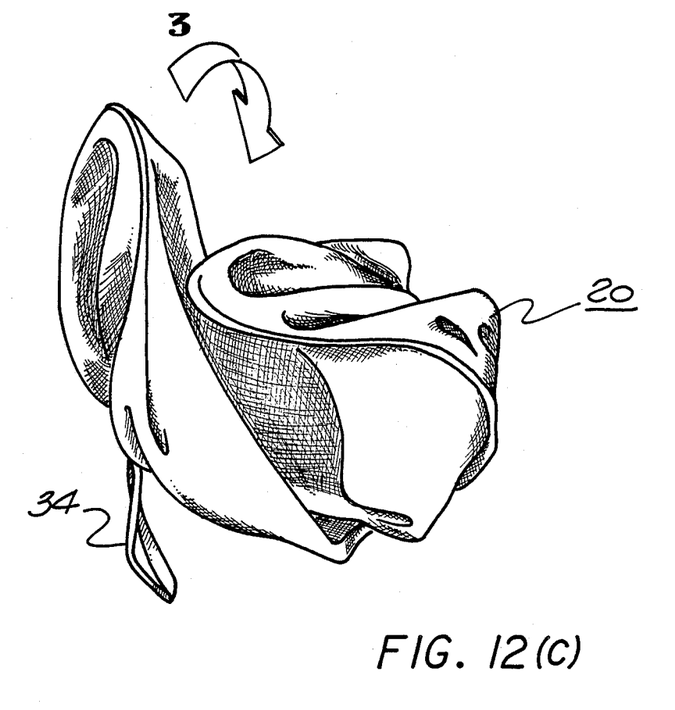
Figure 12D:
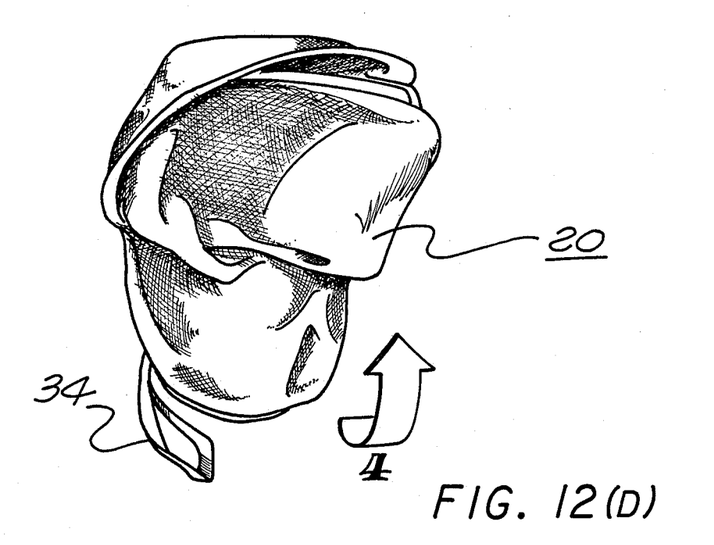
Figures 12E, 12F:
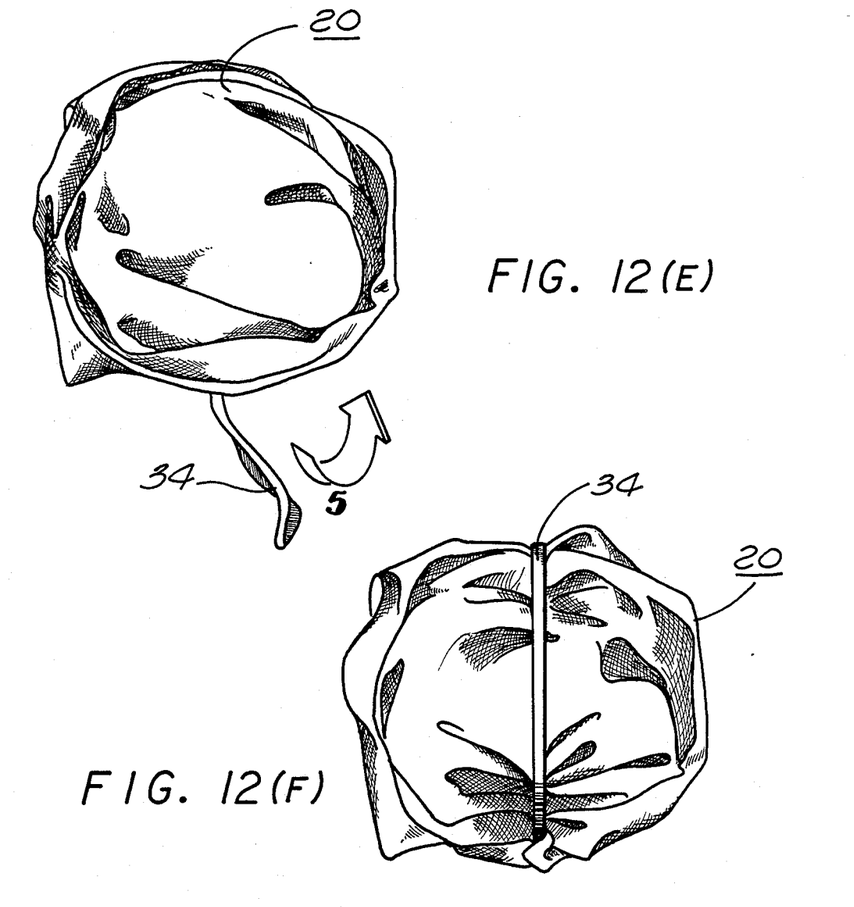

As shown in FIGS. 12(A) through 12(F), the various steps for folding up the sunshield 20 for storage are shown. In FIG. 12(A), the first step consists of folding the two tension loop portions 32 together about the nontensioned fabric portion 28. When the two halves are folded together, the second step, as shown in FIG. 12(B), is to start to twist and fold the substantially circular structure to initially collapse the loops and fabric into a smaller diameter. As shown in FIG. 12(C), the third step is to fold in the opposite border of the circular structure upon the previous fold to further collapse the loop structure with the fabric. As shown in FIG. 12(D), the fourth step is to continue the collapsing so that the size of the collapsed structure is a fraction of the diameter of the initial loop structure. FIG. 12(E) shows the fifth step with the loops and fabric collapsed on each other to provide for a small essentially circular configuration having a plurality of concentric loop rings and layers of fabric so that the collapsed structure has a diameter which is a fraction of the diameter of the structure as shown in FIG. 12(A). The final step shown in FIG. 12(F) is to use the elastic retaining member 34 or bag to hold the collapsed structure in place.

Figure 13:
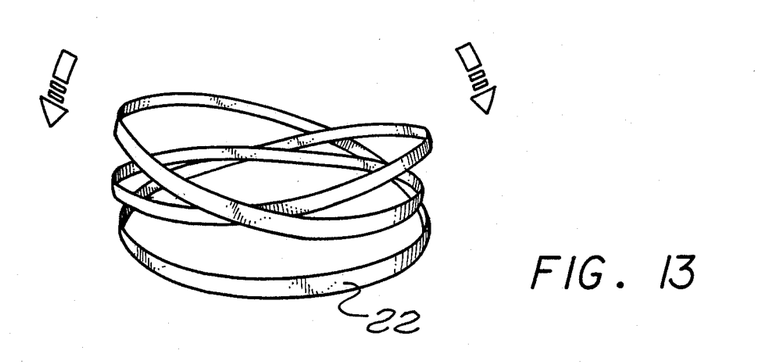
FIG. 13 illustrates a single loop member in the folded up position illustrating how each single loop member is folded to provide for three loop portions to thereby substantially reduce the size.

FIG. 13 illustrates one of the loop frame members 22 in the collapsed state. As can be seen in FIG. 13, the structure essentially consists of three loop rings intertwined to lie flat. Of course, the actual sunshield 20 would have the plurality of frame members 22 collapsed together and with the fabric held in place by the collapsed loop rings. In the collapsed state, the structure would have a diameter less that twelve inches (12") and preferably less that ten inches (10"). It can be seen, therefore, that in the collapsed state the sunshield may be easily stored.

The present invention, therefore, provides for an automobile sun screen in which two or more adjacent fabric covered loops provide for an elongated shaped screen so as to conform to the shape of an automobile windshield or other window. To achieve the collapsed state, the sunshield is first folded in half and then twisted and folded further, causing the loops to collapse within themselves which forms a much smaller series of concentric loops and layers of fabric.

Although the invention has been described with reference to particular embodiments, it is to be appreciated that various adaptations and modifications may be made and the invention is only to be limited by the appended claims.

I claim:
1. A collapsible elongated sunshield including,
a plurality of adjacent collapsible flexible loop members each having an expanded position and a collapsed position,
a fabric covering material for substantially covering the flexible loop members in an extended state to have the adjacent loop members and fabric covering forming the elongated sunshield,
the loop members substantially supporting the fabric in particular areas to provide for loop portions of the fabric maintained to assume a particular configuration in accordance with the loop members in the open position and with an interconnecting portion of the fabric forming a hinge portion between each loop portion of the fabric, and
the loop portions of the fabric being foldable on top of each other about the hinge portion to have the loop members and associated fabric overlaying each other and with the overlaying loop members collapsible to the collapsible positions by twisting and folding to form a plurality of concentric loop rings and layers of fabric to substantially reduce the size of the sunshield in the collapsed state.

2. The collapsible elongated sunshield to claim 1 wherein the collapsible flexible loop members are made of metal.

3. The collapsible elongated sunshield of claim 1 wherein the loop members are each formed of an elongated member bent around and with end portions of the elongated member attached to form the loop.

4. The collapsible elongated sunshield of claim 3 wherein the end portions of the elongated loop member slide relative to each other for providing an adjustment of the size of the loop.

5. The collapsible elongated sunshield of claim 1 wherein the fabric is formed as two layers and with the loop members captured within the two layers of fabric.

6. The collapsible elongated sunshield of claim 1 wherein the fabric is formed as a single layer and with the loop members attached to the one layer of fabric.

7. The collapsible elongated sunshield of claim 1 additionally including flaps of fabric material located outside the loop portions of the fabric and the interconnecting portion of the fabric to provide for an additional sunshield area.

8. The collapsible elongated sunshield of claim 1 wherein the fabric in the loop portion has a circular configuration.

9. The collapsible elongated sunshield of claim 1 wherein the fabric in the loop portion has a truncated configuration in an outer peripheral area to more closely conform to the perimeter of a windshield.

10. The collapsible elongated sunshield of claim 1 additionally including openings in the fabric for providing attachment points for attaching the sunshield in a particular position.

11. The collapsible elongated sunshield of claim 1 additionally including straps for providing attaching the sunshield in a particular position.

12. The collapsible elongated sunshield of claim 1 including two loop portions.

13. The collapsible elongated sunshield of claim 1 including three or more portions.

14. The collapsible elongated sunshield of claim 1 including a retaining member for wrappping around the sunshield in the collapsed state.

15. A method of collapsing an elongated sunshield constructed of a plurality of collapsible flexible loop members each having an expanded position and a collapsed position and a fabric covering material for substantially covering the flexible loop members to form loop portions and with the fabric maintained to assume a particular elongated configuration in accordance with the loop members in the expanded position and with an interconnecting portion of the fabric forming a hinge portion between adjacent loop portions, the method including the following steps:

folding the loop portions of the fabric on top of each other about the hinge portion to have the loop members and associated fabric overlaying each other, and collapsing the overlaying loop members by twisting and folding to form a plurality of concentric loop rings and layers of fabric to substantially reduce the size of the sunshield.

16. The method of claim 15 wherein the sunshield includies a retaining member and additionally including the following step:

wrapping the retaining member around the collapsed sunshield to retain the sunshield in the collapsed state for storage.

* * * * *